United States Patent [19]

Kiesow

[11] 4,156,438
[45] May 29, 1979

[54] MIXING VALVE

[75] Inventor: Lutz A. Kiesow, Bethesda, Md.

[73] Assignee: Baxter Travenol Laboratories, Inc., Deerfield, Ill.

[21] Appl. No.: 850,567

[22] Filed: Nov. 11, 1977

[51] Int. Cl.² .......................................... F16K 11/083
[52] U.S. Cl. ................................ 137/625.41; 251/209
[58] Field of Search ...................... 137/625.47, 625.41, 137/597; 251/209

[56] References Cited

U.S. PATENT DOCUMENTS

| 1,792,906 | 2/1931 | Heilos | 251/209 X |
| 2,893,605 | 7/1959 | Anderson | 137/625.41 X |
| 2,902,253 | 9/1959 | Page | 251/209 |
| 3,980,102 | 9/1976 | Kiesow | 251/205 X |

Primary Examiner—Arnold Rosenthal
Attorney, Agent, or Firm—Henry W. Collins; Paul C. Flattery; Thomas R. Vigil

[57] ABSTRACT

The mixing valve includes structure having two gas inlets and two gas outlets. The proportions of the two gases, at each of the outlets, is varied inversely in accordance with the position of a rotatable portion of the mixing valve. If the back pressure at the two outlets is equal, and if the supply pressure of the two gases is equal, the proportioning of the two gases will be accurately determined by the adjustment of the valve. Thus, in an automatically controlled system requiring the presence of gases in time-variable proportions, proper proportioning can be achieved by the use of the mixing valve without the necessity of a gas testing analyzer and a feedback system for controlling a conventional mixture proportioning valve.

9 Claims, 3 Drawing Figures

MIXING VALVE

BACKGROUND OF THE INVENTION

1. Field of the Invention

The field of the invention is mixing valves for mixing two fluids together in variable accurate proportions.

2. Description of the Prior Art

The oxygen binding curve of blood is a plot of the oxygen concentration of the atmosphere to which the blood is exposed against the resulting optical properties of the blood. It is understood that blood which is well oxygenated is reddish, while blood which is lacking in oxygen is bluish.

The shape of the oxygen binding curve is of substantial physiological and clinical significance, as it furnishes information on the oxygen transport ability and health of the blood.

In the prior art it has been common to expose the blood sample in a chamber to an atmosphere which is varied by initially filling the test chamber with one gas, say nitrogen, inserting the sample, and then purging the chamber with the other gas, say oxygen. Instrumentation, responsive to oxygen concentration in the chamber, controls the X axis of a plotter while optical means, sensing the blood properties, controls the Y axis of the plotter.

By means of the mixing valve disclosed in U.S. Pat. No. 3,980,102 it is possible to directly and accurately control the oxygen concentration in the test chamber in a mechanical way, rather than indirectly by purging and measuring the resulting concentration. Furthermore, the movement of the mechanical control means is linearly related to the oxygen concentration achieved, so that it is simple to control the X axis of the plotter in accordance with said movement.

The mixing valve disclosed hereinafter is related to the mixing valve disclosed and claimed in U.S. Pat. No. 3,980,102 issued to this applicant on Sept. 14, 1976. In this prior patent there is disclosed a mixing valve which functions in the manner described above and which has a rectangular base and a rectangular slide member which cooperates with the base. As will be described hereinafter in greater detail the mixing valve of the present invention proposes a rotatable core in place of the base and a cylindrical housing in place of the slide member.

SUMMARY OF THE INVENTION

According to the present invention there is provided a mixing valve for mixing two fluids in any desired proportion in accordance with the rotatable movement of a portion of said valve and for providing two outputs of mixed fluids, one output mixed in one proportion and one output mixed in an opposite proportion, comprising:

first and second members each having a coacting smooth curved surface arranged in abutting relationship to the other surface;

means for moving said first and second members relative to each other through a limited operating range, with said abutting surfaces rotatably sliding on each other in fluid-tight contact;

first, second, third and fourth metering ports in the smooth curved surface of said first member, each of said metering ports being of tapered shape along, and extending in, an arcuate operating path about said curved surface of said first member and having, along said operating path, a width, measured in a direction transverse to said arcuate path which varies monotonically along said arcuate path the sense of variation of said first and third metering ports being identical and the sense of variation of said second and fourth ports being opposite to the sense of variation of said first and third ports;

scanning port means in said second member for cooperating with each of said metering ports, said scanning port means comprising plural, narrow slits extending tranversely of said arcuate operating path, and being so located that each of the metering ports is concomitantly scanned over its said operating path by its cooperating slit as the first and second members move relatively with respect to each other over said limited range;

each of said first, second, third and fourth metering ports and its cooperating narrow slit respectively defining first, second, third and fourth variable throttling valves, the hydraulic resistance of each of which varies monotonically with relative movement of said first and second members over said limited range, the hydraulic resistance of said first and third variable throttling valves varying in one sense, and that of the second and fourth variable throttling valves varying in the opposite sense with said relative movement.

DETAILED DESCRIPTION

Figure 1:
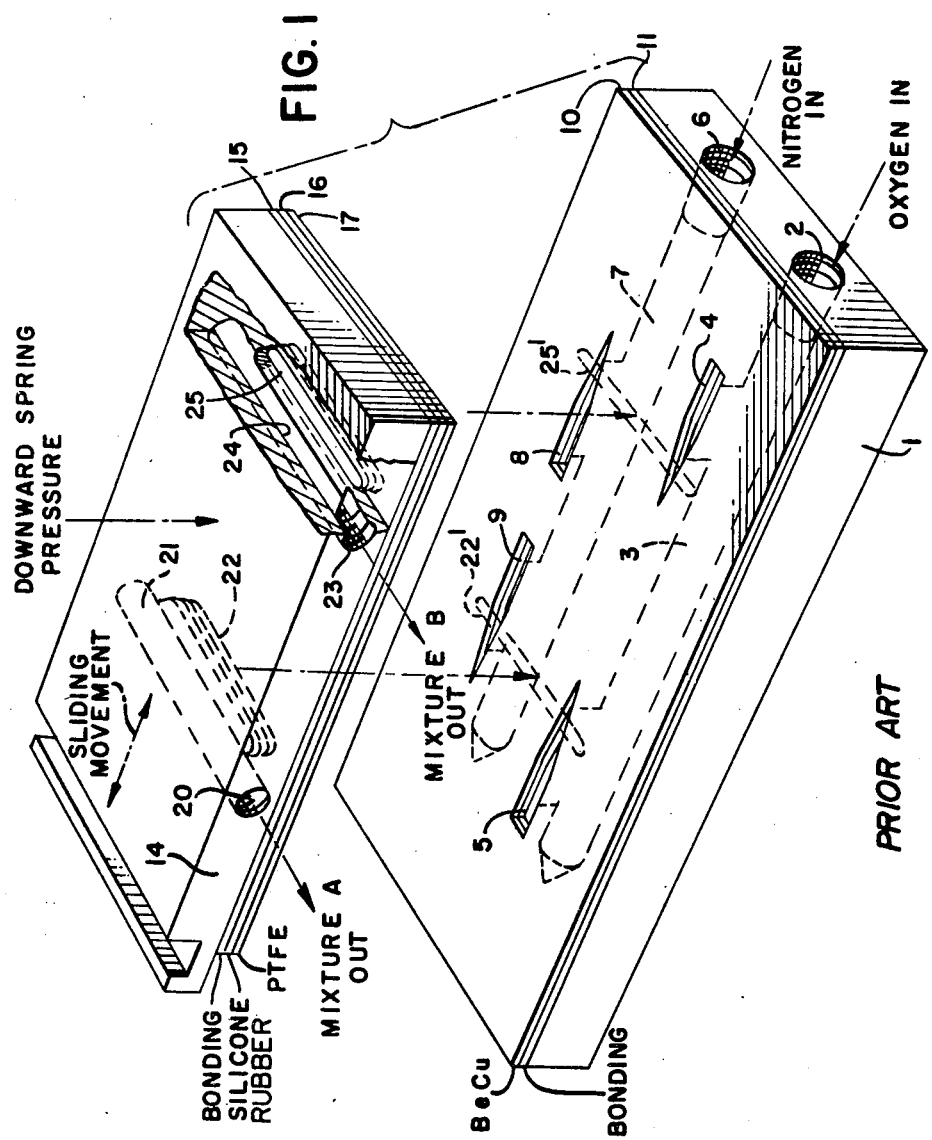
FIG. 1 is an exploded and partly cross-sectional perspective view of a prior art mixing valve.

In FIG. 1 the base 1 of a mixing valve of the type disclosed in U.S. Pat. No. 3,980,102 has an oxygen inlet connection 2 which is connected by way of an oxygen duct 3 to metering ports 4 and 5. These two ports have tapered widths which vary oppositely, so that the tapers resemble arrowheads pointing at each other.

The base 1 also has a nitrogen inlet 6 which is connected by way of nitrogen duct 7 to metering ports 8 and 9. These two ports have tapered widths which also vary oppositely, but the tapers in this instance resemble arrowheads pointing away from each other.

The upper face of base 1, which is machined flat, is provided with a beryllium copper facing 10 which is cemented to the base 1 by means of a bonding lamina 11, which may be, for example, a silicone rubber composition.

The particular shape of the metering ports 4,5,8 and 9 is determined by apertures formed in the beryllium copper facing 10. The apertures are formed in the beryllium copper facing 10 by etching through photoresist masks. It has been found desirable to etch from both sides of the facing 10 in order to get squarely sharp apertures. The shape of the apertures determines the properties of metering ports 4,5,8 and 9.

The base 1, contains the ducts 3 and 7, which have branches which extend to the face of base 1, against which the beryllium copper facing 10 is cemented through the bonding lamina 11. Each of the branches is surrounded, at the said face, by a groove which, by supplying a flow path adjacent a branch, permits the copper beryllium facing 10 to be more readily cemented to the base 1.

Cooperating with the metering ports 4, 5, 8 and 9 is a slide member 14, which is normally pressed downward by spring pressure against the beryllium copper facing 10, but which is seen in FIG. 1 in a raised position to show the parts better. The lower face of slide member 14 is provided with a low friction facing of polytetrafluoroethelene (PTFE) 17, which is cemented to slide member 14 by means of a layer of silicone rubber 16 and a layer of bonding material 15.

The slide member 14 has a "Mixture A" outlet 20 which is connected by a bore 21 to a narrow scanning slit port 22. The slide member 14 also has a "Mixture B" outlet 23 which is connected by a bore 24 to narrow scanning slit port 25. When the slide member 14 is lowered to bring the PTFE facing 17 into contact with the beryllium copper facing 10, the scanning slit port 22 lowers to position 22', and the scanning slit port 25 lowers to position 25'. Each of scanning slit ports 22 and 25 can slide longitudinally, from the approximately mid-range position of 22' and 25', in the direction indicated by the double headed arrow labeled "sliding movement", and the total range of movement is approximately equal to the length of the taper of the metering ports 5 and 9.

When the scanning slit port 22 is in a first position the intersection between port 5 and port 22 is large while that between port 9 and port 22 is small. Therefore, a large amount of oxygen flows into the scanning slit port 22, through the bore 21 and to the "Mixture A" outlet 20. At the same time, a small amount of nitrogen flows into scanning slit port 22, through the bore 21 and to "Mixture A" outlet. If the slit is in a second position, the "Mixture A" outlet receives a mixture which is principally nitrogen with a small amount of oxygen.

The scanning slit port 25 moves along its metering ports 4 and 8 in ganged relationship with the movement of scanning slit port 22 along its metering ports 5 and 9. However, because metering ports 4 and 8 point oppositely to metering ports 5 and 9, respectively, the proportions of the mixture at the "Mixture B" outlet 23 varies inversely with movement of slide member 14 while the proportions of the mixture at the "Mixture A" outlet vary directly with the movement of slide member 14. Thus, as the proportions of the oxygen and nitrogen at the "Mixture A" outlet will be varying in the sequence 100% & 0%, 50% & 50%, 0% & 100%, the proportions at the "Mixture B" outlet will, at the same time, vary sequentially in the inverse proportion, namely 0% & 100%, 50% & 50%, 100% & 0%.

In order to ensure the proportioning stated above, it is necessary to supply the nitrogen and oxygen at pressures which are constant and equal and to exhaust the two outlets to receiving means offering constant and equal back pressures. For example, the "Mixture A" outlet may be connected to an experimental chamber which exhausts to the atmosphere. In that instance, the "Mixture B" outlet could be connected to a similar dummy chamber which also exhausts to the atmosphere, thereby achieving equal back pressures.

With constant and equal supply pressures and constant and equal back pressures, and using triangular metering ports, the proportioning of oxygen and nitrogen will almost exactly be a linear function of the displacement of slide member 14. The variable throttling orifice formed by the intersection of the metering port and the scanning slit port acts very much like a sharp edged orifice to the flow of the gases. Since the pressure drop across the throttling orifice is constant, and since the sharp edges produce turbulent flow, it follows, for gases of low molecular weights, that the rate of flow depends principally on the area of the throttling orifice.

As the scanning slit port moves to the very point of the metering port, the sides of the throttling orifice close in on the gas stream. As a result, the throttling orifice no longer acts as much as a sharp edged orifice, and the gas flow, at the constant pressure drop, changes from turbulent flow to laminar flow. It follows that for the same per unit area of throttling orifice, more gas will flow under laminar flow conditions when the throttling orifice is almost closed than when it is more widely open and turbulent flow prevails. Accordingly, if the pressure drop is suitably selected and the sides of the metering port are suitably profiled, as much gas will flow through the truncated triangle so formed under laminar flow conditions as would flow through the complete triangle formed if the flow were turbulent.

To achieve exact linearity of proportion of the mixture with displacement of the slide 14, the sides of the metering orifices could be "shaded". As a practical matter, it has been found that straight sides for the triangle with an easily achieved radius of not more than 0.003 inches at the apex gives results which adequately satisfy the requirements for linearity in biological experiments.

The construction and operation of the mixing valve described above is also found in the issued U.S. Pat. No. 3,980,102 and forms no part of the present invention.

Figure 2:
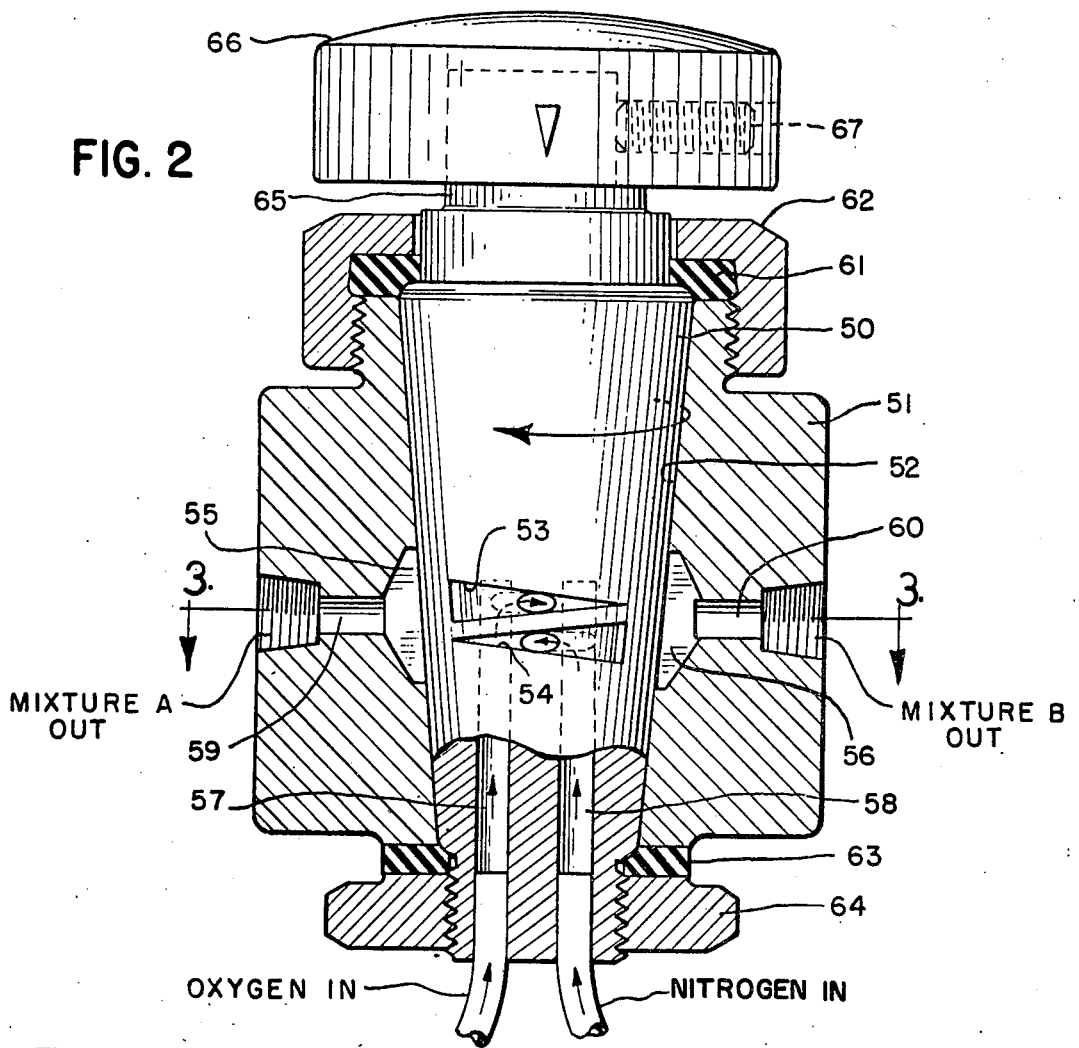
FIG. 2 is a side elevational view, partially in cross-section, showing a rotatable mixing valve constructed in accordance with the teachings of the present invention.
Figure 3:
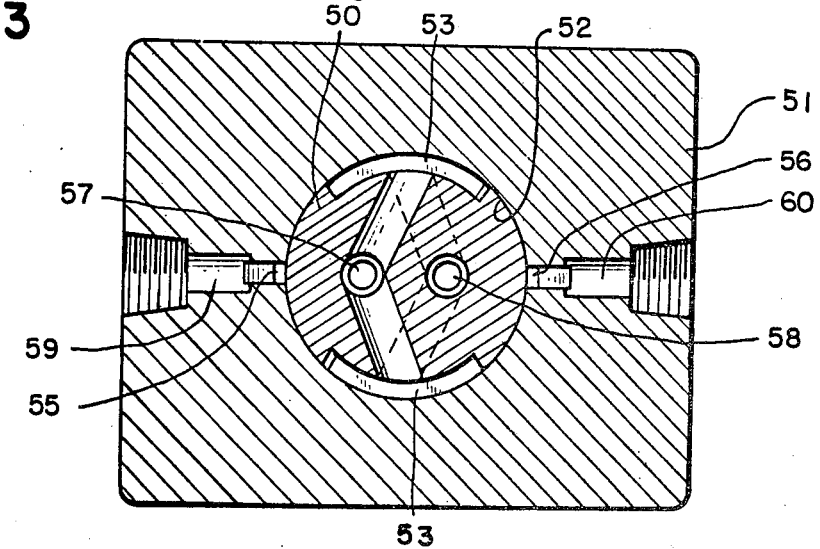
FIG. 3 is a cross-sectional view taken along line 3—3 of FIG. 2.

According to the teachings of the present invention a rotatable mixing valve is shown in FIGS. 2 and 3. In this construction of a rotatable mixing valve, the base member of the valve takes the form of a rotatable core 50, and the slide member takes the form of a housing 52 having an aperture 52 in which the core is seated. Flow control is achieved by means of oppositely tapered metering ports 53 and 54 located one above the other at diametrically opposed locations on the side of the core 50 which coact with slit-like scanning ports 55 and 56 similarly located on the side wall of aperture 52.

Oxygen is supplied to the two metering ports 53 by means of a passageway 57, which includes an axial portion connected to the oxygen source, and two radial portions connected to respective ones of the oxygen metering ports. Nitrogen is similarly supplied to the two metering ports 54 by means of a passageway 58, which includes an axial portion connected to the nitrogen source, and two radial portions connected to respective ones of the nitrogen metering ports. Passageways 59 and 60 in housing 51 connect the scanning ports 55 and 56 to Mixture A and Mixture B outlet ports, respectively.

Core 50 is held in vapor-tight engagement with housing 51 by means of a conventional gasket 61 and compression nut 62, which may be screwed into a threaded sleeve provided on the housing. A gasket 63 and compression nut 64 may be provided at the opposite end of the housing to complete the seal. To facilitate removal of the core 50 from the recess 52, the core 50 may be frusto-conical in form, and the recess 52 may be complimentarily formed. A rotational stop of conventional design (not shown) is preferably provided to limit the rotation of core 50 to less than 180°.

To facilitate rotation of the core 50 with respect to the housing 51, the core 50 is preferably provided with a shank portion 65 onto which a knob 66 is fastened by a set screw 67 or other appropriate fastening means. When housing 51 is fixed in position, as by being mounted to a stationary platform or other support (not shown), rotation of knob 66 causes the core 50 to rotate and the two pairs of metering ports 53,54 to come into communication with respective ones of the scanning ports 55,56. Since the area of the oxygen metering port 53 exposed to the scanning port 55 progressively decreases with clockwise rotation of core 50 (as viewed from above) while the area of the nitrogen metering port 54 exposed to the scanning port 56 progressively increases, clockwise rotation of knob 66 has the effect of reducing oxygen portion and increasing nitrogen portion at the Mixture A outlet port. A similar arrangement for the other pair of metering ports 53,54 results in an increasing oxygen portion and a decreasing nitrogen portion at the Mixture B outlet port.

It will be appreciated that operation of the mixing valve shown in FIGS. 2 and 3 is like that of the valve shown in FIG. 1, and that similar principles are involved in dimensioning the metering ports for linearity of proportion of mixture with displacement of the core 50. Furthermore, the surface of the core 50 and/or on the wall of aperture 52 can have a lining, such as sheet of beryllium copper or a sheet of polytetrafluoroethylene, together with a sheet of appropriate elastomeric bonding material.

The rotatable mixing valve of the present invention has a number of advantages, some of which have been described above and others of which are inherent in the invention. Accordingly, various modifications can be made to the rotatable mixing valve without departing from the teachings of the invention and the scope of the invention is to be limited only as necessitated by the accompanying claims.

I claim:

1. A mixing valve for mixing two fluids in any desired proportion in accordance with the rotatable movement of a portion of said valve and for providing two outputs of mixed fluids, one output mixed in one proportion and one output mixed in an opposite proportion, comprising:
   first and second members each having a coacting smooth curved surface arranged in abutting relationship to the other surface;
   means for moving said first and second members relative to each other through a limited operating range, with said abutting surfaces rotatably sliding on each other in fluid-type contact;
   first, second, third and fourth metering ports in the smooth curved surface of said first member, each of said metering ports being of tapered shape along, and extending in, an arcuate operating path about said curved surface of said first member and having along said operating path, a width, measured in a direction transverse to said arcuate path, which varies monotonically along said arcuate path, the sense of variation of said first and third metering ports being identical and the sense of variation of said second and fourth ports being opposite to the sense of variation of said first and third ports;
   scanning port means in said second member for cooperating with each of said metering ports, said scanning port means comprising plural, narrow slits extending transversely of said arcuate operating path and being so located that each of the metering ports is concomitantly scanned over its said operating path by its cooperating slit as the first and second members move relatively with respect to each other over said limited range;
   each of said first, second, third and fourth metering ports and its cooperating narrow slit respectively defining first, second, third and fourth variable throttling valves, the hydraulic resistance of each of which varies monotonically with relative movement of said first and second members over said limited range, the hydraulic resistance of said first and third variable throttling valves varying in one sense, and that of the second and fourth variable throttling valves varying in the opposite sense with said relative movement.

2. The mixing valve of claim 1 wherein said second member comprises a housing defining a recess therein, said scanning ports being arranged in the side wall of said recess, and wherein said first member comprises a core rotatably seated in said recess in vapor-tight relationship to said housing, said metering ports being arranged in the side wall of said core whereby said metering ports communicate with said scanning ports to a varying degree as said core is rotated with respect to said housing.

3. The mixing valve of claim 2 wherein said scanning ports are aligned substantially parallel to the axis of said core, and said metering ports are arranged in planes substantially perpendicular to the axis of said core.

4. The mixing valve of claim 3 wherein said core and said recess are substantially frusto-conical in form.

5. The mixing valve of claim 1 further comprising:
   duct means for connecting a first inlet connection to said first and fourth variable throttling valves;
   duct means for connecting a second inlet connection to said second and third variable throttling valves;
   duct means for connecting a first outlet connection to said first and second throttling valves;
   duct means for connecting a second outlet connection to said third and fourth throttling valves;
   whereby each throttling valve is connected to both one inlet and one outlet connection, and two fluids supplied respectively to said first and second inlet connection are variably mixed in accordance with said relative movement of said first member and said second member, and are delivered to said first outlet connection in a mixture directly varying in proportion to said movement and are delivered to said second outlet connection in a mixture varying inversely in proportion to said movement.

6. The mixing valve of claim 5 in which
   one of the first and second members is faced on its smooth curved face with a sheet of beryllium copper.

7. The mixing valve of claim 5 in which
   one of the first and second members is faced on its smooth curved face with a sheet of polytetrafluoroethylene.

8. The mixing valve of claim 5 in which
   one of the first and second members is faced on its smooth curved face with a sheet of beryllium copper, and
   the other of said first and second members is faced on its smooth curved face with a sliding sheet of polytetrafluoroethylene.

9. The mixing valve of claim 5 in combination with:
   means for supplying each of said first and second inlet connections with an individual source of fluid at equal pressures; and
   means for connecting each of first and second outlet connections to individual receiving means having equal back pressures.

* * * * *